United States Patent
Tsukamoto

(10) Patent No.: US 9,540,792 B2
(45) Date of Patent: Jan. 10, 2017

(54) SHOVEL CONNECTABLE WITH AN INFORMATION TERMINAL

(71) Applicant: SUMITOMO(S.H.I.) CONSTRUCTION MACHINERY CO., LTD., Tokyo (JP)

(72) Inventor: Hiroyuki Tsukamoto, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/591,251

(22) Filed: Jan. 7, 2015

(65) Prior Publication Data

US 2015/0114731 A1    Apr. 30, 2015

Related U.S. Application Data

(63) Continuation of application No. PCT/JP2013/068767, filed on Jul. 9, 2013.

(30) Foreign Application Priority Data

Jul. 19, 2012   (JP) ................... 2012-160909

(51) Int. Cl.
  *E02F 9/26*   (2006.01)
  *E02F 3/32*   (2006.01)
  (Continued)

(52) U.S. Cl.
  CPC .............. *E02F 9/26* (2013.01); *B60K 35/00* (2013.01); *E02F 3/32* (2013.01); *E02F 9/16* (2013.01);
  (Continued)

(58) Field of Classification Search
  CPC .............. E02F 9/26; E02F 3/32; E02F 9/2004; E02F 9/16; E02F 9/2075; E02F 9/267; G06F 3/167; B60K 35/00; B62D 33/073; G10L 17/22
  (Continued)

(56) References Cited

U.S. PATENT DOCUMENTS 6,349,252 B1   2/2002  Imanishi et al.
8,271,713 B2   9/2012  Grady et al.
(Continued)

FOREIGN PATENT DOCUMENTS

JP    H05-287782    11/1993
JP    H09-095982    4/1997
(Continued)

OTHER PUBLICATIONS

International Search Report mailed on Oct. 22, 2013.

*Primary Examiner* — Marthe Marc-Coleman
(74) *Attorney, Agent, or Firm* — IPUSA, PLLC

(57) ABSTRACT

A shovel performing a work by being operated by a driver includes a lower running body, an upper turning body mounted on the lower running body and a control device that controls an operation of a hydraulic actuator in response to an operation applied to an operation lever. A cabin is provided in the upper turning body. An attaching part is provided in the cabin and is capable of attaching a multifunctional portable information terminal having a display and input function, a wireless communication function and a voice recognition function. The attaching part includes a connecting part connected to the multifunctional portable information terminal. The control device performs data communication with the multifunctional portable information terminal through the connecting part, and supplies electric power from an electric accumulation part of the (Continued)

shovel to the multifunctional portable information terminal through the connecting part.

13 Claims, 15 Drawing Sheets

(51) Int. Cl.
    *E02F 9/20* (2006.01)
    *G10L 17/22* (2013.01)
    *B60K 35/00* (2006.01)
    *E02F 9/16* (2006.01)
    *G06F 3/16* (2006.01)

(52) U.S. Cl.
    CPC .............. *E02F 9/2004* (2013.01); *G10L 17/22* (2013.01); *E02F 9/2075* (2013.01); *E02F 9/267* (2013.01); *G06F 3/167* (2013.01)

(58) Field of Classification Search
    USPC ......... 701/50, 33.2; 180/53.8, 89.12; 37/907
    See application file for complete search history.

(56) References Cited

U.S. PATENT DOCUMENTS

| | | | |
|---|---|---|---|
| 9,211,811 B2* | 12/2015 | Breed | B60C 11/24 |
| 2001/0034250 A1* | 10/2001 | Chadha | G06F 1/1616 |
| | | | 455/566 |
| 2004/0030919 A1 | 2/2004 | Moriya et al. | |
| 2006/0131040 A1* | 6/2006 | Barber | A01B 63/11 |
| | | | 172/200 |
| 2007/0203701 A1* | 8/2007 | Ruwisch | G10L 15/065 |
| | | | 704/254 |
| 2009/0118844 A1* | 5/2009 | Schmuck | E02F 3/96 |
| | | | 700/83 |
| 2010/0100379 A1* | 4/2010 | Abe | G10L 15/18 |
| | | | 704/235 |
| 2012/0028680 A1* | 2/2012 | Breed | B60C 11/24 |
| | | | 455/556.1 |
| 2013/0096771 A1* | 4/2013 | Srenger | B60K 37/06 |
| | | | 701/36 |
| 2013/0231160 A1* | 9/2013 | Rao | H04W 4/16 |
| | | | 455/563 |
| 2013/0238168 A1* | 9/2013 | Reyes | B64C 39/024 |
| | | | 701/2 |
| 2015/0287406 A1* | 10/2015 | Kristjansson | G10L 21/0232 |
| | | | 704/233 |

FOREIGN PATENT DOCUMENTS

| | | | |
|---|---|---|---|
| JP | 2000-297443 | | 10/2000 |
| JP | 2001-127372 | | 5/2001 |
| JP | 2002-030701 | | 1/2002 |
| JP | 2002-322679 | | 11/2002 |
| JP | 2002322679 | * | 11/2002 |
| JP | 2003-219474 | | 7/2003 |
| JP | 2005-035426 | | 2/2005 |
| JP | 2005035426 A | * | 2/2005 |
| JP | 2010-105567 | | 5/2010 |
| JP | 2010105567 A | * | 5/2010 |
| JP | 2010-523008 | | 7/2010 |
| JP | 2010-178032 | | 8/2010 |
| JP | 2011-127372 | | 6/2011 |
| JP | 2012-123645 | | 6/2012 |
| JP | 2012123645 | * | 6/2012 |

\* cited by examiner

SHOVEL CONNECTABLE WITH AN INFORMATION TERMINAL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/068767 filed on Jul. 9, 2013, designating the U.S., which claims priority based on Japanese Patent Application No. 2012-160909 filed on Jul. 19, 2012. The entire contents of each of the foregoing applications are incorporated herein by reference.

BACKGROUND

1. Technical Field

The present invention relates to a shovel connectable with an information terminal.

2. Description of Related Art

It has been suggested to manage an operation of a shovel by a managing device using a computer. Specifically, it is suggested to provide a monitor device including an input device and a display device in a driver's cab of a shovel in order to allow a driver to input a work condition and display information indicating an operating condition or operating situation to the driver.

If a known monitor device is provided in the vicinity of a driver's seat, the monitor device may be an obstacle for a view of the driver seating on the driver's seat because the monitor device is large. A large glass window is provided in front of the driver's seat in the driver's cab of the shovel so that the drive can see a position to perform a work. The driver seating on the driver's seat operates the shovel by operating an operation device while watching ahead of the driver's cab through the glass window.

Because the operation device and other devices are provided in the vicinity of the driver's seat, there is a limited space for arranging the monitor device. As a location of arranging the monitor device which allows the driver to view the monitor device while seeing ahead of the driver's cab, a location close to a front frame of the driver's cab is suitable. With the monitor device arranged at this position, the driver who is watching ahead of the driver's cab can see the display device of the monitor device by slightly shifting one's visual line and also can easily operate the input device of the monitor device by merely extending one's arm.

However, the size of the known monitor device is determined without considering an influence given to the driver's view. Thus, even if the monitor device is placed in the vicinity of the front frame of the driver's cab, the monitor device may be an obstacle for the driver's view. Additionally, if an expensive monitor device is installed as an exclusive component part to all shovels, a cost of each shovel is raised.

Thus, it is desirable to develop a shovel that can provide the same input and display function as the known monitor device without installing an exclusive monitor device to the shovel.

SUMMARY

According to an aspect of the present invention, there is provided a shovel performing a work by being operated by a driver. The shovel includes a lower running body, an upper turning body mounted on the lower running body. An engine is arranged on the upper turning body. A hydraulic pump discharges an operating oil by a power of the engine. A hydraulic actuator is driven by the operating oil discharged by the hydraulic pump. A control device controls an operation of the hydraulic actuator in response to an operation applied to an operation lever. A cabin is provided in the upper turning body. An attaching part is provided in the cabin and configured to be capable of attaching a multifunctional portable information terminal having a display and input function, a wireless communication function and a voice recognition function. The attaching part includes a connecting part connected to the multifunctional portable information terminal. The control device performs data communication with the multifunctional portable information terminal through the connecting part, and supplies electric power from an electric accumulation part of the shovel to said multifunctional portable information terminal through the connecting part.

DETAILED DESCRIPTION

A description will now be given, with reference to the drawings, of embodiments of the present invention.

Figure 1:
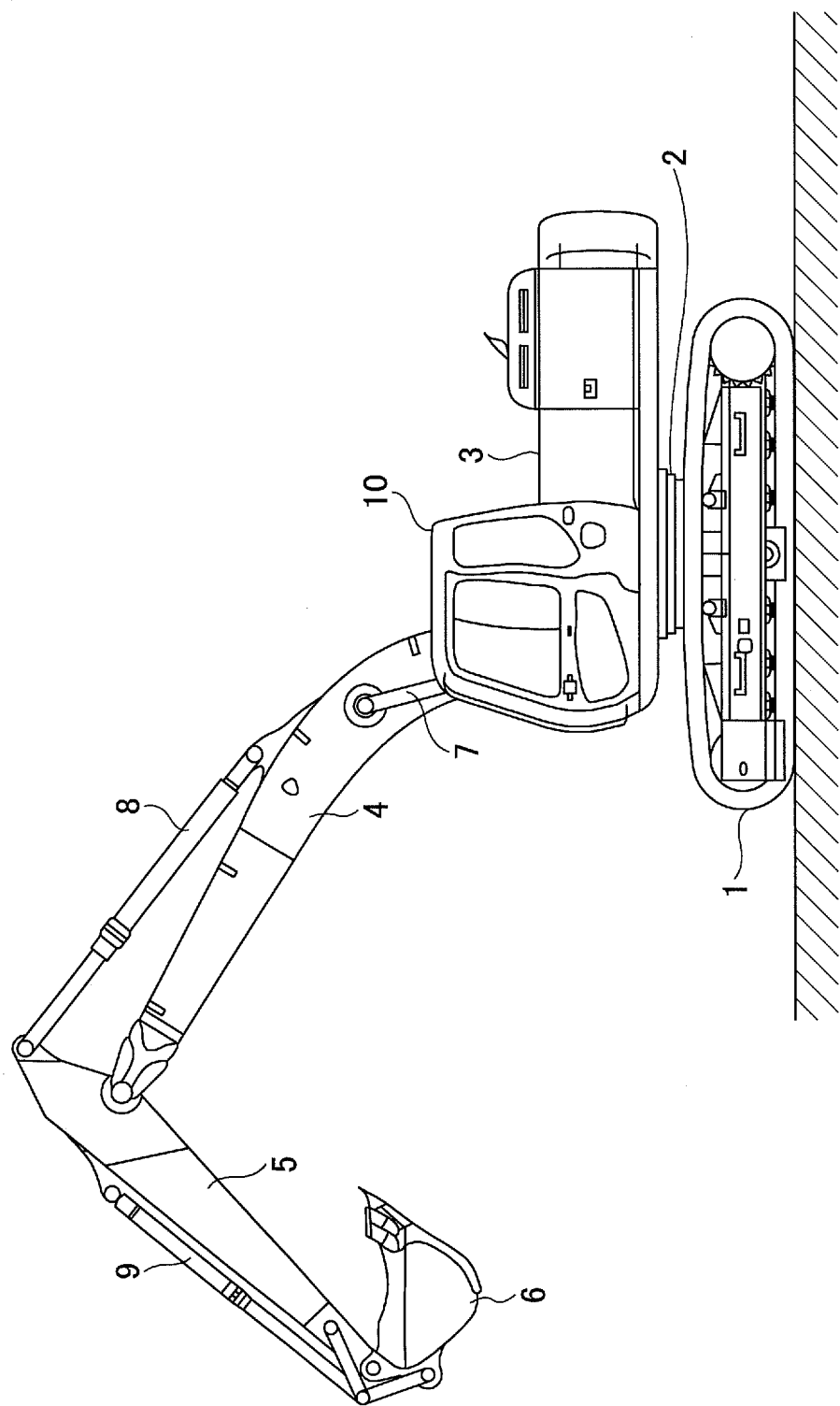
FIG. 1 is a side view of a shovel according to an embodiment of the present invention.

FIG. 1 is a side view of a shovel (excavator) according to an embodiment of the present invention. The shovel includes a lower running body 1 and an upper turning body 3 mounted on the lower running body 1 via a turning mechanism 2. A boom 4 is attached to the upper turning body 3. An arm 5 is attached to an end of the boom 4. A bucket 6 is attached to an end of the arm 5. The boom 4, arm 5 and bucket 6 are hydraulically driven by a boom cylinder 7, arm cylinder 8 and bucket cylinder 9, respectively. A cabin 10 is provided to the upper turning body 3. A power source such as an engine is also provided to the upper turning body 3. The cabin 10 is provided with a driver's seat so that a driver or operator operates the shovel while sitting on the driver's seat.

Figure 2:
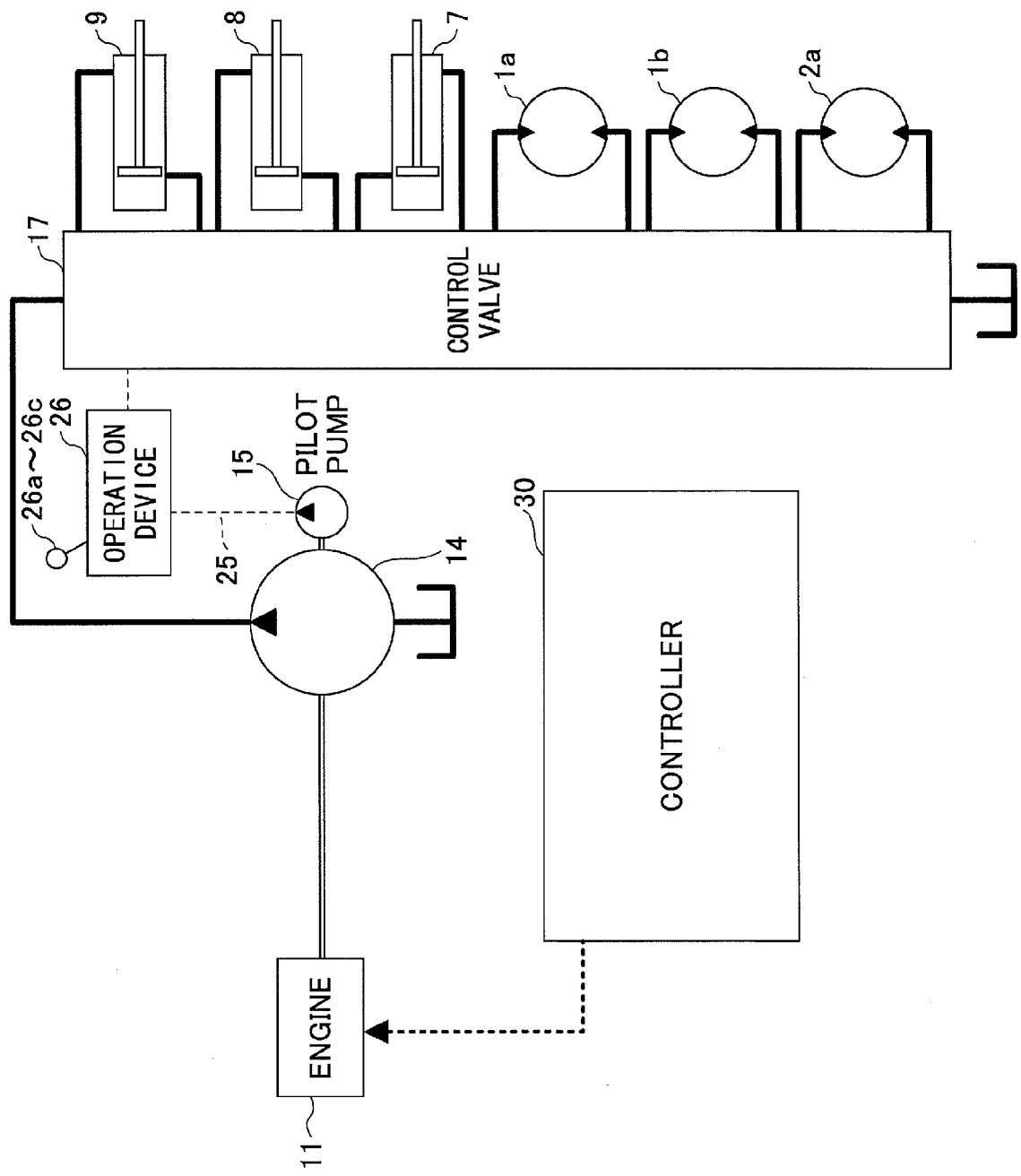
FIG. 2 is a block diagram illustrating a configuration of a drive system of the shovel illustrated in FIG. 1.

FIG. 2 is a block diagram illustrating a structure of a drive system of the shovel illustrated in FIG. 1. In FIG. 2, double lines denote a mechanical power system, bold solid lines denote high-pressure hydraulic lines, thin dashed lines denote pilot lines, and a bold dashed line arrow denotes an electric drive/control system.

The drive system of the shovel is mainly constituted by an engine 11, a main pump 14, a pilot pump 15, a control valve 17, an operation device 26 and a controller 30.

The engine 11 is a drive power source of the shovel, and is operated to maintain a predetermined number of revolutions. An output axis of the engine 11 is connected to an input axis of each of the main pump 14 and the pilot pump 15.

The main pump 14 is, for example, a swash plate type variable capacity hydraulic pump, which supplies an operating oil to the control valve 17 through a high pressure hydraulic line 16. The pilot pump 15 is, for example, a fixed capacity hydraulic pump, which supplies an operating oil to various hydraulic control devices through a pilot line 25.

The control valve 17 is a hydraulic control valve for controlling the hydraulic system in the hydraulic shovel. The control valve 17 selectively supplies the operating oil supplied from the main pump 14 to one or a plurality of the boom cylinder 7, arm cylinder 8, bucket cylinder 9, running hydraulic motor 1A (right), running hydraulic motor 1B (left) and turning hydraulic motor 2A. Note that, in the following description, the boom cylinder 7, the arm cylinder 8, bucket cylinder 9, running hydraulic motor 1A (right), running hydraulic motor 1B (left) and turning hydraulic motor 2A are collectively referred to as the "hydraulic actuator".

The operation device 26 is used by an operator to operate the hydraulic actuators by supplying the operating oil supplied from the pilot pump 15 to pilot ports of the flow control valve corresponding to the respective hydraulic actuators through a pilot line 25. The pressure of the operating oil supplied to each of the pilot ports is set to a pressure responding to an operating direction and operating amount of a lever or pedal 26A-26C corresponding to a respective one of the hydraulic actuators.

The controller 30 is a control device for controlling an operating speed of each of the hydraulic actuators, which is constituted by a computer equipped with, for example, a CPU (Central Processing Unit), a RAM (Random Access Memory), a ROM (Read Only Memory), etc. The CPU of the controller 30 executes processes corresponding to programs corresponding to the operation and function of the shovel while reading the programs from the ROM and developing it on the RAM.

In the shovel having the above-mentioned structure, an input and display device is arranged in the vicinity of the driver's seat in order to assist the driver to operate the shovel. In the present embodiment, a portable information device (generally, referred to as the "portable terminal") is used as the input and display device. More specifically, a so-called smartphone, tablet terminal, etc., which is a multifunctional portable information terminal as a portable terminal is arranged in the vicinity of the driver's seat to use as an input and display device. The driver can input information and instructions to the control part of the shovel using the display and input function of the multifunction portable information terminal. Moreover, information can be provided to the driver by causing an operating condition and control information of the shovel to be displayed on the display part of the multifunctional portable information terminal.

In recent years, the multifunctional portable information terminal has been spread widely, and most of drivers of shovels have the multifunctional portable information terminal. Thus, by providing an attaching part such as a holder to attach a multifunctional portable information terminal at a predetermined position in the vicinity of the driver's seat, the driver of the shovel can use one's own multifunctional portable information terminal by attaching the one's own multifunctional portable information terminal to the attaching part when starting an operation of the shovel. The portable device used as an input and display apparatus of the shovel as mentioned above is not limited to one's own multifunctional portable information terminal, and may be a portable device which is previously prepared to be used for a shovel by the employer.

The attaching part for the multifunctional portable information terminal is provided with a connector for connecting the multifunctional portable information terminal to the control part of the shovel to perform data communication so that the data communication can be performed between the multifunctional portable information terminal and the control part of the shovel in a state where the multifunctional portable information terminal is attached to the attaching part. Many multifunctional portable information terminal of recent years are provided with a micro USB connector socket for connecting with an external device. Thus, by providing a micro USB connector socket in the attaching part for the multifunctional portable information terminal, the multifunctional portable information terminal can be connected to the control part of the shovel.

There are many cases where a multifunctional portable information terminal of recent years is provided with a short-distance wireless communication device using Bluetooth (Registered Trademark) or a short-distance wireless communication device using an infrared communication. Thus, the data communication between the multifunctional portable information terminal and the control part of the shovel may be performed using such a short-distance wireless communication.

Here, if the display device of the multifunctional portable information terminal is continuously used, the battery runs out for, for example, 2 to 3 hours of use. If the time of work by the shovel is longer than the battery run-out time, the multifunctional portable information terminal becomes unusable in the middle of the work. Thus, according to the present embodiment, an electric power can be supplied from the power supply part of the shovel to the multifunctional portable information terminal in a state where the multifunctional portable information terminal is attached to the attaching part.

Specifically, if, for example, the data communication is performed using the micro USB connector as mentioned above, a power supply can be performed through the micro USB connector. If the multifunctional portable information terminal has a connector exclusive for power supply, a connector connectable to such a connector may be provided to the attaching part.

As mentioned above, by providing the attaching part for the multifunctional portable information terminal in the vicinity of the driver's seat in the cabin 10 of the shovel, the multifunctional portable information terminal can be used as an input and display device of the shovel by merely attaching the multifunctional portable information terminal to the attaching part.

Figure 3:
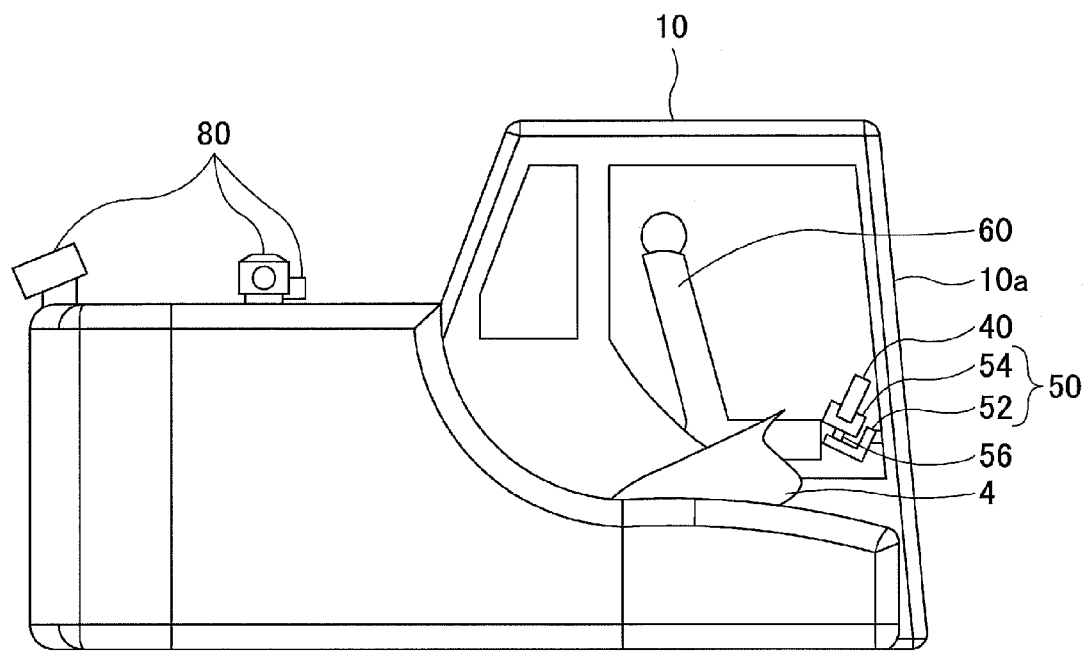
FIG. 3 is a side view of an interior of a cabin provided with an attaching part for a multifunctional portable information terminal.
Figure 4:
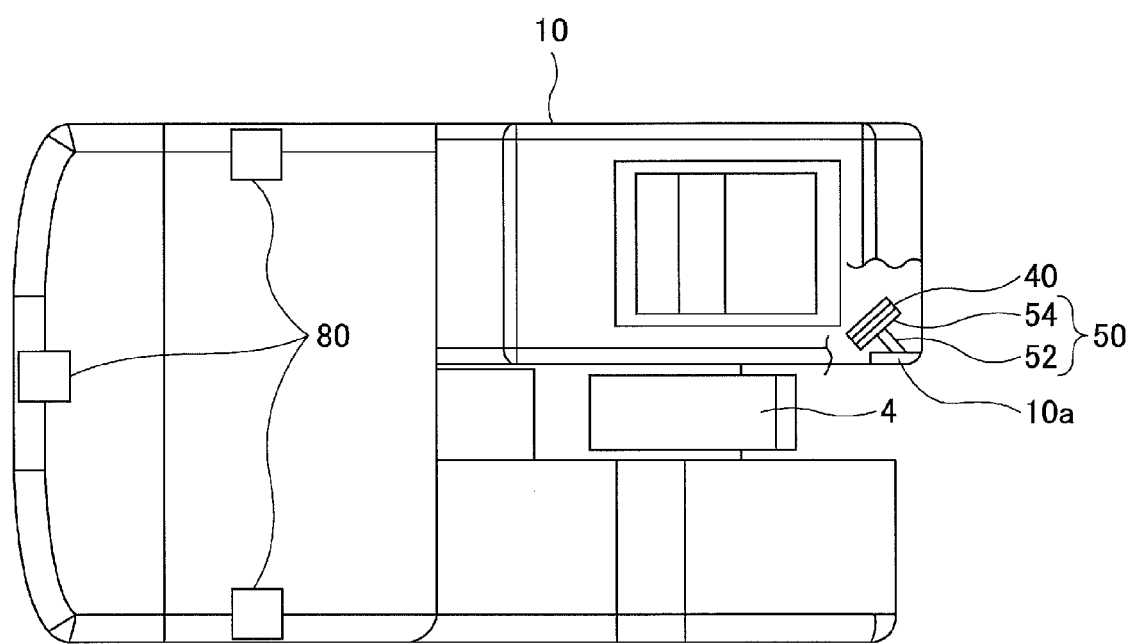
FIG. 4 is a plan view of the cabin provided with the attaching part for a multifunctional portable information terminal.

FIG. 3 is a side view of the cabin illustrating the interior of the cabin provided with the attaching part for the multifunctional portable information terminal. FIG. 4 is a plan view of the cabin provided with the attaching part for the multifunctional portable information terminal.

The attaching part 50 for attaching the multifunctional portable information terminal 40 includes an installation table 52 and a mounting part 54 supported by the installation table 52. The installation table 52 is attached and fixed to a frame 10*a* of the cabin 10 provided with the driver's seat 60. The mounting part 54 is supported by the installation table 52 via a vibration suppressing mechanism 56 including an elastic material such as a spring or soft rubber so that a vibration or shock in the cabin 10 is not directly transmitted to the mounting part 52 via the vibration suppressing mechanism 56. That is, the mounting part is supported by the installation table 52 via the vibration suppressing mechanism 56 so that a vibration or shock transmitted to the multifunctional portable information terminal fixed to the mounting part 54 is suppressed.

Generally, the boom 4 is located on the right side of the driver sitting on the driver's seat 60, and, in many cases, the driver operates the shovel while visually recognizing the bucket 6 and the arm 5 attached to the end of the boom 4. Although the frame 10*a* on the front right side of the cabin 10 is a part that blocks the view of the driver, the attaching part 40 for the multifunctional portable information terminal 40 is provided using this part in the present embodiment. Thus, because the multifunction portable information terminal 40 is located in an area that already obstructs view, the multifunction portable information terminal 40 itself cannot block the driver's view. Depending on the width of the frame 10*a*, the multifunctional portable information terminal 40 is preferably placed vertically on and fixed to the mounting part 54 so that the entire multifunctional portable information terminal 40 falls within the width of the frame 10*a*.

Figure 5:
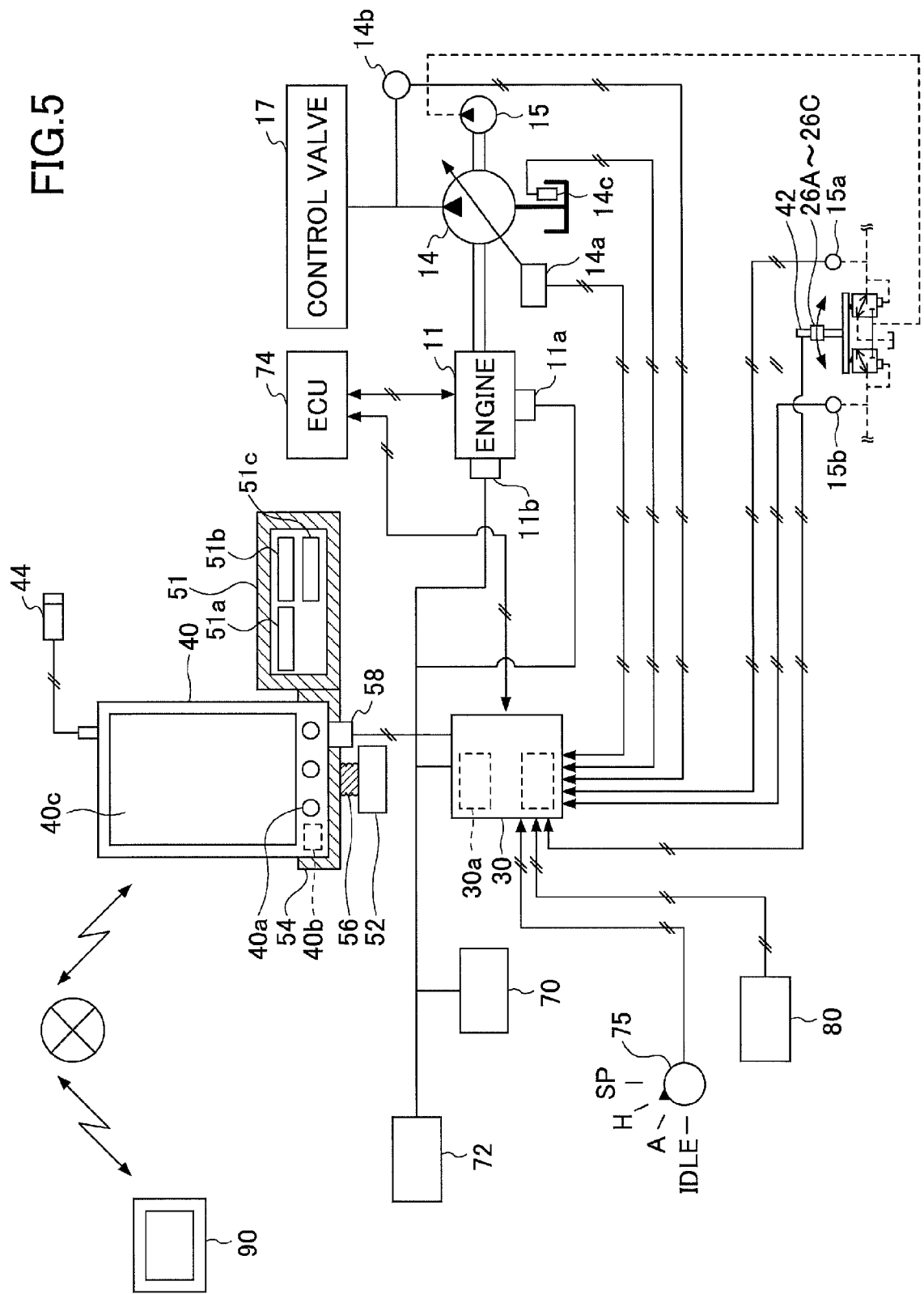
FIG. 5 is a block diagram illustrating a connection of a controller of the shovel and a multifunctional portable information terminal.

FIG. 5 is a block diagram illustrating the connection between the controller 30 (control device) of the shovel and the multifunctional portable information terminal 40. In the present embodiment, as illustrated in FIG. 5, the attaching part 50 includes a switch panel 51. The switch panel 51 is a panel including various hardware switches, and is attached to the mounting part 54. In the present embodiment, the switch panel 51 includes a light switch 51*a*, wiper switch 51*b* and window washer switch 51*c*. The light switch 51*a* is a switch for turning on/off a light attached to the exterior of the cabin 10. The wiper switch is a switch for operating/stopping a wiper. The window washer switch 51*c* is a switch for injecting an window washer liquid.

When the multifunction portable information terminal 40 is attached to the mounting part 54 of the attaching part 50, the multifunction portable information terminal 40 is connected to the controller 30 of the shovel via the connecting part 58. More specifically, a plug of a micro USB connector provided in the mounting part 54 is inserted into and connected to a receptacle (socket) of a micro USB connector of the multifunction portable information terminal 40, and, thereby, data communication can be performed between the multifunction portable information terminal 40 and the controller 30. In the present embodiment, the micro USB connector constitutes the connecting part 58.

The micro USB connector is a connector that enables an electric power supply as well as the connection for data communication. The controller 30 is driven by electric power supplied from a storage battery 70 (for example, 24 V battery) mounted to the shovel. Because the controller 30 is capable of causing an electric power to be supplied from the rechargeable battery 70 to the multifunction portable information terminal 40 via the connecting part 58, the multifunction portable information terminal 40 can be operated with the electric power supplied from the storage battery 70 of the shovel without consuming its own battery power. Moreover, the form of the connecting part 58 is not limited to a contact type such as the micro USB connector in which wires are caused to contact with each other, and may be of a non-contact type.

The storage battery 70 is charged by electric power generated by an alternator 11*a* of the engine 11. The electric power of the storage battery is supplied also to an electric component 72 of the shovel other than the controller 30. Moreover, a starter 11*b* of the engine 11 is driven by the electric power from the storage battery to start the engine 11.

The engine 11 is controlled by an engine control unit (ECU) 74. Various kinds of data indicating a state of the engine 11 (for example, data indicating a cooling water temperature (physical amount)) is always transmitted from the ECU 74 to the controller 30. Accordingly, the controller 30 can store the data in a temporary storing part (memory) 30*a* to send the data to the multifunction portable information terminal 40 when it is needed.

The controller 30 is supplied with various kinds of data as mentioned below, and the data is stored in the temporary storing part 30*a*.

First, data indicating a swash plate angle is supplied to the controller 30 from a regulator 14*a* of the main pump 14, which is a variable capacity hydraulic pump. Additionally, data indicating a discharge pressure of the main pump 14 is sent to the controller 30 from a discharge pressure sensor 14*b*. These sets of data (data indicating physical amounts) are stored in the temporary storing part 30*a*. An oil temperature sensor 14*c* is provided to a tank in which the operating oil to be taken in by the main pump 14 is stored, and data indicating a temperature of the operating oil in the tank is supplied to the controller 30 from the oil temperature sensor 14*c*.

Moreover, a pilot pressure sent to the control valve 17 when operating the operation levers and pedal 26A to 26C is detected by hydraulic pressure sensors 15*a* and 15*b*, and data indicating the detected pilot pressure is sent to the controller 30. The data (data indicating a physical amount) is stored in the temporary storing part 30*a*.

Moreover, in the present embodiment, as illustrated in FIG. 5, the shovel is equipped with an engine revolution number adjusting dial 75 in the cabin 10. The engine revolution number adjusting dial 75 is a dial for adjusting a number of revolutions of an engine, and, in the present embodiment, capable of changing the number of revolutions of the engine in four steps. Additionally, data indicating a setting state of the number of revolutions of the engine is always sent to the controller 30. The engine revolution number adjusting dial 75 can switch the number of revolutions of the engine between four steps, that is, an SP mode, H mode, A mode and idling mode. Note that FIG. 5 illustrates a state where the H mode is selected by the engine revolution number adjusting dial 75.

The SP mode is a work mode that is selected when it is desirous to give a priority to an amount of work. A highest number of revolutions of the engine is used in the SP mode. The H mode is a work mode that is selected when it is desirous to achieve both a large amount of work and a low fuel consumption. A second highest number of revolutions of the engine is used in the H mode. The A mode is a work mode that is selected when it is desirous to operate the shovel with a low noise while a priority is given to a fuel consumption. A third highest number of revolutions of the engine is used in the A mode. The idling mode is a work mode that is selected when it is desirous to set the engine in an idling state. A lowest number of revolutions of the engine is used in the idling mode. The engine 11 is subjected to a revolution number control to maintain one of the numbers of revolutions of the engine, which is set by the adjusting dial 75.

Figure 6:
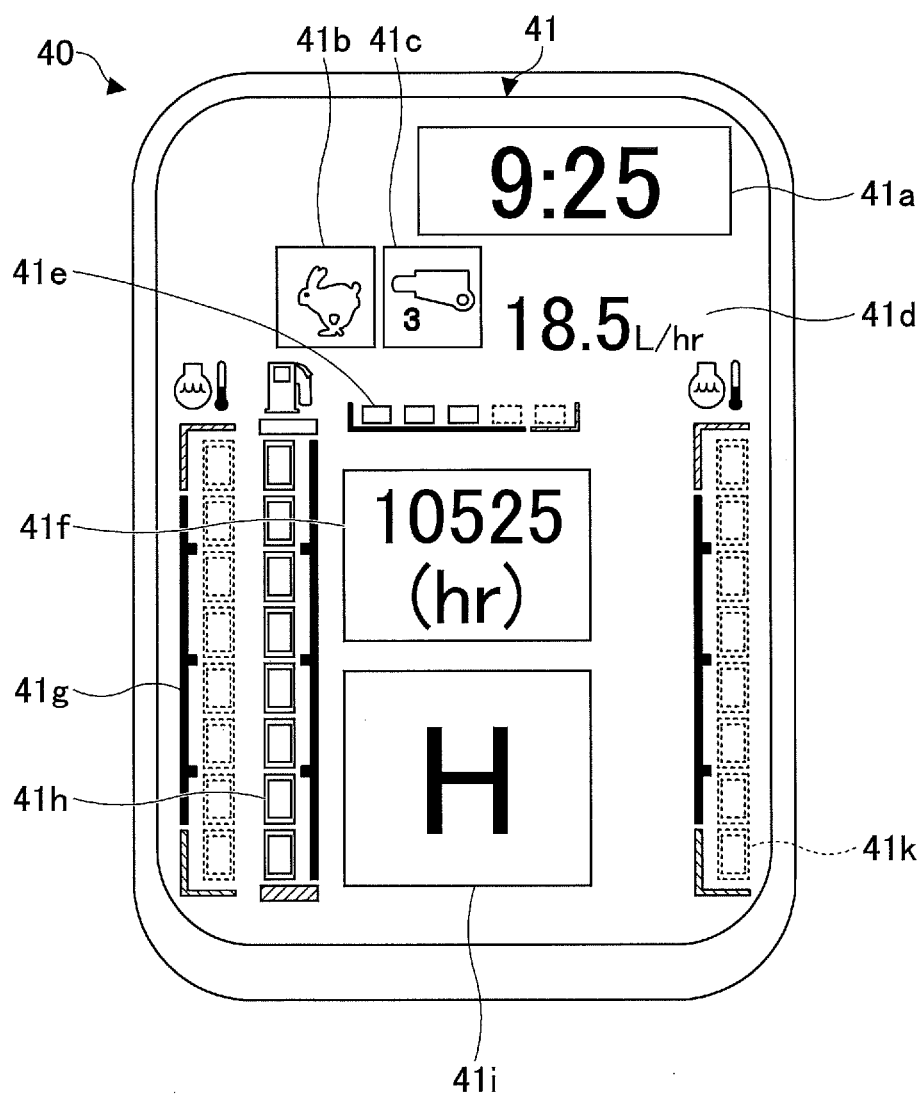
FIG. 6 is a main screen provided by a shovel control application.
Figure 7:
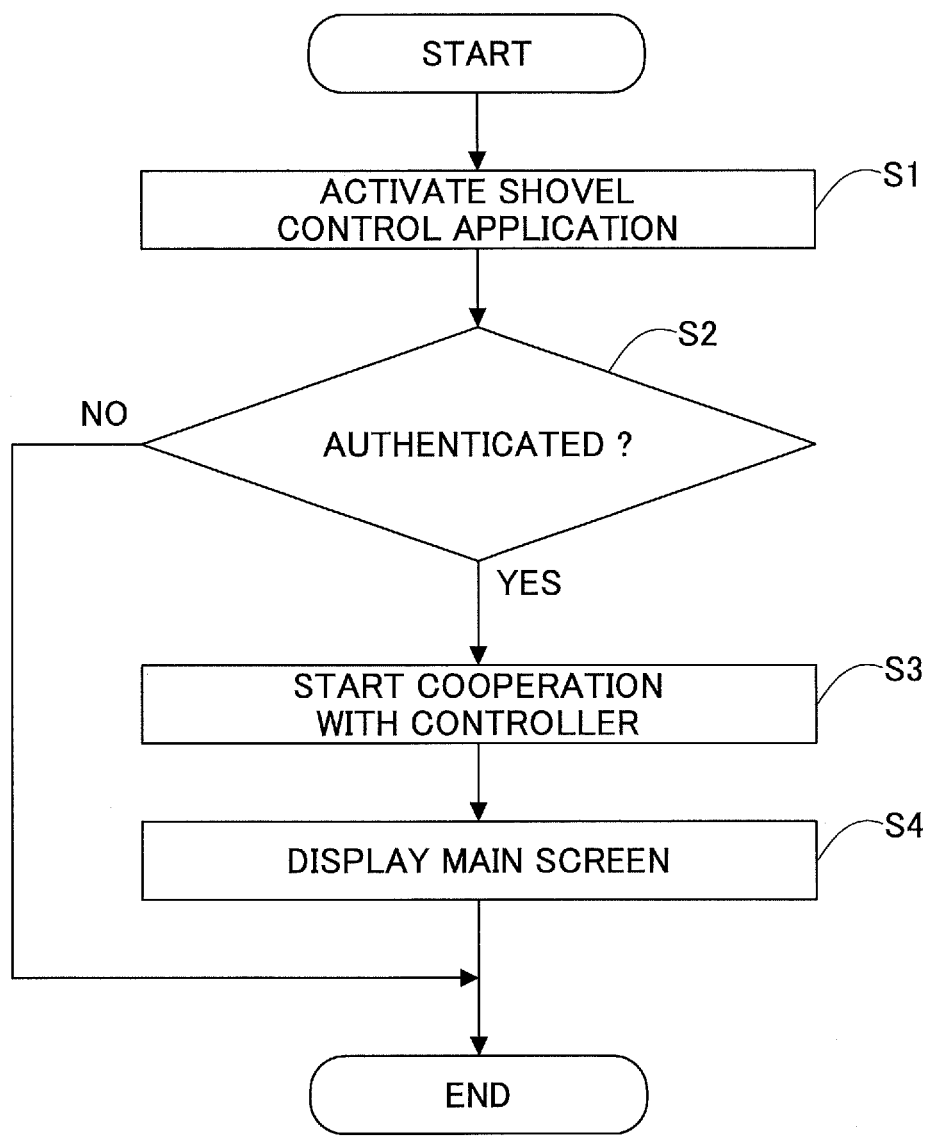
FIG. 7 is a flowchart of a main screen displaying process.

A description is given below, with reference to FIG. 6 and FIG. 7, of application software for controlling a shovel (hereinafter, referred to as the "shovel control application") that runs on the multifunctional portable information terminal 40. FIG. 6 is an example of a main screen provided by the shovel control application. FIG. 7 is a flowchart of a process for displaying the main screen of the shovel control application by the multifunctional portable information terminal 40 (hereinafter, referred to as the "main screen display process").

As illustrated in FIG. 6, the main screen 41 of the shovel control application is displayed on a display and input device 40c of the multifunctional portable information terminal 40. In the present embodiment, the main screen 41 includes a time display part 41a, run mode display part 41b, attachment display part 41c, average fuel consumption display part 41d, exhaust gas filter display part 41e, engine operation time display part 41f, cooling water temperature display part 41g, fuel remaining amount display part 41h, work mode display part 41i and operating oil temperature display part 41k.

The time display part 41a is an area for displaying a present time. In the example illustrated in FIG. 6, a digital display is used, and it is indicated that the present time is "9:25".

The run mode display part 41b is an area for displaying a present run mode. The run mode represents a setting state of a hydraulic motor for running using a variable capacity pump. Specifically, the run mode includes a low-speed mode and a high-speed mode. The low-speed mode is displayed by a tortoise-shaped mark, and the high-speed mode is displayed by a rabbit-shaped mark. In the example illustrated in FIG. 6, the rabbit-shaped mark is displayed and, thereby, the driver can recognize that the high-speed mode is set.

The attachment display part 41c is an area for displaying an image representing an attachment that is presently attached. Attachments attachable to a shovel include a bucket, rock breaker, grapple, lifting magnet, etc. The attachment display part 41c displays, for example, a mark shaped in one of these attachments and a number corresponding to the one of these attachments. In the example illustrated in FIG. 6, a rock-breaker-shaped mark is displayed and also "3" as a number indicating an output of the rock breaker is displayed.

The average fuel consumption display part 41d is an area for displaying an average fuel consumption at a present time. In the example illustrated in FIG. 6, a value using a unit [L/hr (litter/hour)] is displayed. The present average fuel concentration may be displayed using other representations such as a bar graph or the like. Note that the average fuel consumption is acquired based on a command value of a fuel injection amount returned from the controller 30 to the engine 11.

The exhaust gas filter state display part 41e is an area for displaying a degree of clogging of an exhaust gas filter (for example, a diesel particulate filter (DPF)). In the example illustrated in FIG. 6, a bar graph indicating a ratio of a present use time to a maximum use time of the exhaust gas filter is displayed.

The engine operation time display part 41f is an area for displaying an accumulated operation time of the engine. In the example illustrated in FIG. 6, a value using a unit "hr (hour)" is displayed.

The cooling water temperature display part 41g is an area for displaying a present temperature of the engine cooling water. In the example illustrated in FIG. 6, a bar graph indicating a state of the cooling water temperature is displayed.

The fuel remaining amount display part 41h is an area for displaying a remaining amount of the fuel stored in a fuel tank. In the example illustrated in FIG. 6, a bar graph indicating a state of a present fuel remaining amount is displayed.

The work mode display part 41i is an area for displaying a present work mode. The work mode includes, for example, four modes such as the above-mentioned SP mode, H mode, A mode and idling mode. In the example illustrated in FIG. 6, a sign "H" representing the H mode is displayed.

The operating oil temperature display part 41k is an area for displaying a temperature of the operating oil in the operating oil tank. In the example illustrated in FIG. 6, a bar graph indicating a state of the operating oil temperature is displayed.

Next, a description is given, with reference to FIG. 7, of a flow of a main screen display process. The multifunctional portable information terminal 40 executes the main screen display process each time it is attached to the mounting part 54 of the attaching part 50. The shovel control application is downloaded through a network. The shovel control application may be distributed using a recording medium.

First, the multifunctional portable information terminal 40 activates the shovel control application (step S1).

Thereafter, the multifunctional portable information terminal 40 sends identification information of its own previously stored therein to the controller 30 in order to acquire an authentication by the controller 30 (step S2).

If an authentication by the controller 30 is not acquired (NO in step S2), the multifunctional portable information terminal 40 ends the main screen display process at this time without causing a cooperation with the controller 30 to begin and without displaying the main screen 41.

On the other hand, if an authentication by the controller 30 is acquired (YES in step S2), the multifunctional portable information terminal 40 causes a cooperation with the controller 30 (step S3). Specifically, the multifunctional portable information terminal 40 receives various kinds of data (fuel remaining amount, etc.), which are necessary for displaying the main screen 41, from the controller 30.

Thereafter, the multifunctional portable information terminal 40 displays the main screen 41, and updates display contents in the display parts such as the run mode display part 41b, attachment display part 41, etc., based on the various kinds of data received from the controller 30 (step S4).

As mentioned above, upon causing a cooperation with the controller 30 to start, the multifunctional portable information terminal 40 displays the main screen 41 on the display and input device 40c. Additionally, the controller 30 is set in a state where it can receive a command from the multifunctional portable information terminal 40 by causing a cooperation with the multifunctional portable information terminal 40.

Here, a description is given, with reference to FIG. 5 again, of the cooperation between the controller 30 of the shovel and the multifunctional portable information terminal 40.

In the present embodiment, a switch 42, which is operated when a driver desires to use a voice input function of the multifunctional portable information terminal 40, is provided to the operation lever 26A. When the driver operates the switch 42, a signal is sent to the controller 30. The controller 30 sends a control signal to the multifunctional portable information terminal 40 based on the signal so as to turn on the voice input function of the multifunctional portable information terminal 40.

Thus, the driver can easily operate the switch 42 without releasing the operation lever so that the drive can input a command to the control device of the shovel using the voice input function of the multifunctional portable information terminal 40.

As a microphone for voice inputting, a microphone 40a incorporated in the multifunctional portable information terminal 40 can be used. That is, the driver can input a voice signal from the microphone 40a to a voice recognition part 40b of the multifunctional portable information terminal 40 by uttering a voice indicating a desired command toward the multifunctional portable information terminal 40 after operating the switch 42 provided to the operation lever. The voice recognition part 40b of the multifunctional portable information terminal 40 applies a voice recognition process to the voice signal input from the microphone 40a, and determines a command corresponding to the input voice signal. The command determined by the voice recognition part 40b is displayed on the display and input device 40c (for example, a touch panel) of the multifunctional portable information terminal 40, and is sent to the controller 30 of the shovel through the connecting part 58. As mentioned above, a command intended by the driver is input to the shovel through the voice recognition function of the multifunctional portable information terminal 40. Note that an external microphone 44 may be connected to the multifunctional portable information terminal 40, and the external microphone 44 may be arranged at a position where the driver can easily input a voice.

Figure 8:
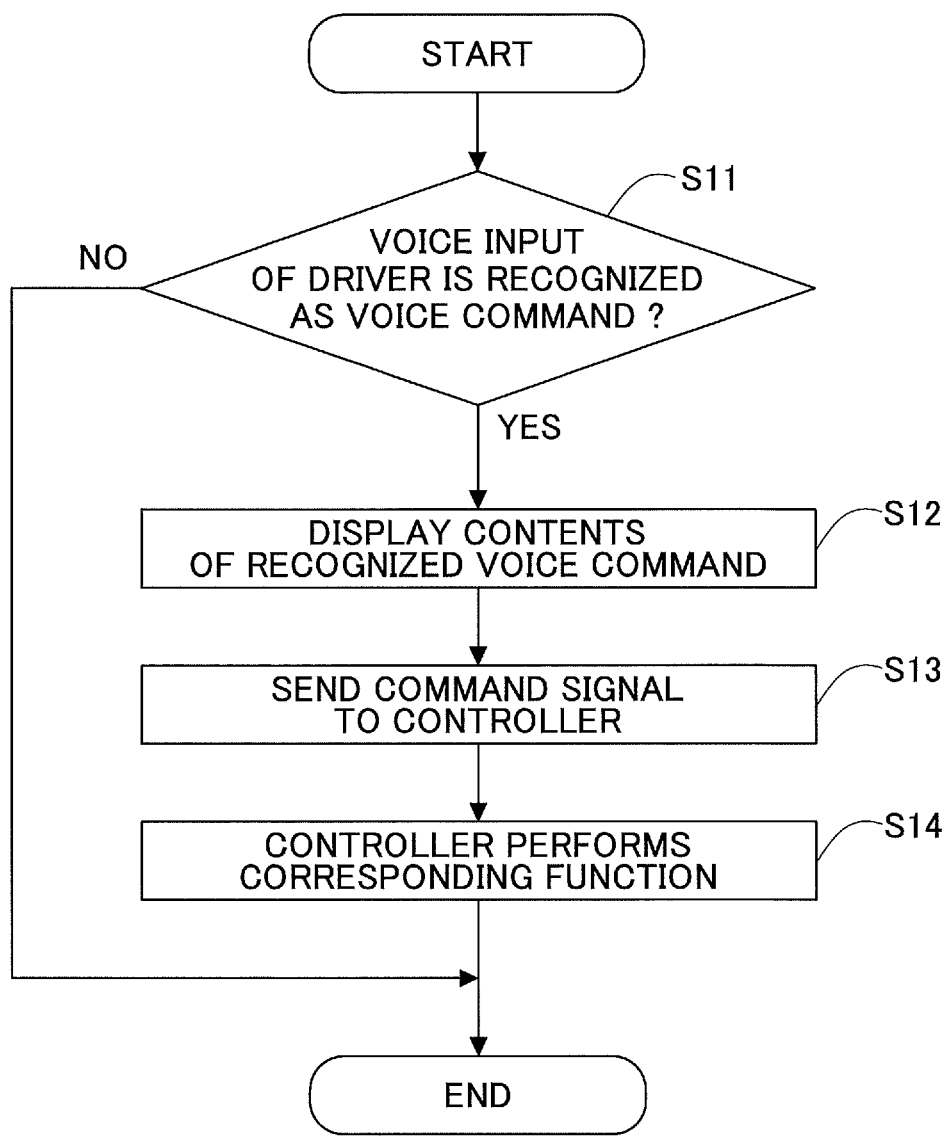
FIG. 8 is a flowchart of a voice command executing process.
Figure 9:
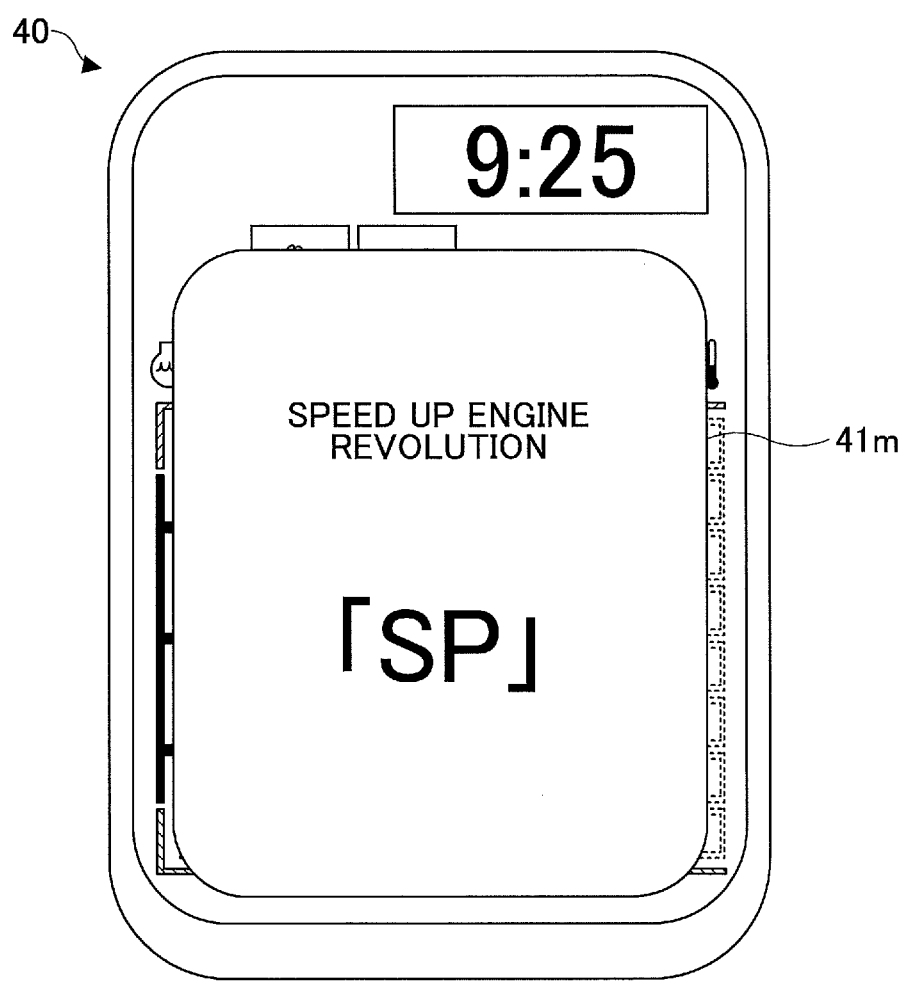
FIG. 9 is an example of a voice command recognition screen.

A description will be given, with reference to FIG. 8 and FIG. 9, of a case where the driver raises a number of revolutions of the engine 11 using the voice input. FIG. 8 is a flowchart illustrating a flow of a process for executing a function corresponding to a driver's voice command that is recognized by the multifunctional portable information terminal 40 (hereinafter, referred to as the "voice command execution process"). FIG. 9 illustrates an example of a screen that is displayed on the display and input device 40c (hereinafter, referred to as the "voice command recognition screen") when the voice recognition part 40b can recognize the contents of the voice input by the drivers as a voice command.

First, the voice recognition part 40b of the multifunctional portable information terminal 40 determines whether the voice input by the driver can be recognized as a voice command (step S11).

If the voice input by the driver cannot be recognized as a voice command (NO in step S11), the multifunctional portable information terminal 40 ends the voice command execution process at this time. For example, even when the voice of the driver can be recognized as a word having meaning, the multifunctional portable information terminal 40 determines that it is not a voice command and ends the voice command executing process if the recognized word corresponds to a predetermined word (hereinafter, referred to as the "registered word") registered beforehand.

On the other hand, if the voice input by the driver can be recognized as a voice command (YES in step S11), the multifunctional portable information terminal 40, displays the contents of the recognized command on the display and input device 40c (step S12).

FIG. 9 illustrates an example of a voice command recognition screen of a case where the voice input "SP" by the driver can be recognized as a registered word "SP" corresponding to the function for increasing a number of revolutions of the engine. In this case, the multifunctional portable information terminal 40 causes a voice command display part 41m including the contents of the recognized voice command "raise the number of revolutions of the engine" and the registered word "SP" to be displayed in a pop-up manner.

Thereafter, the multifunctional portable information terminal 40 sends the command signal corresponding to the recognized voice command to the controller 30 (step S13). Note that the order of step S12 and step S13 is not fixed, and the multifunctional portable information terminal 40 may cause the voice command recognition screen to be displayed after sending the command signal, or may perform the sending of the command signal and the display of the voice command recognition screen simultaneously.

Thereafter, the controller 30, which received the command signal, performs a function corresponding to the command signal (step S14). In the present embodiment, the controller 30 performs the function for increasing a number of revolutions of the engine.

As mentioned above, the driver can increase a number of revolutions of the engine by using the voice input function of the multifunctional portable information terminal 40.

More specifically, in order to perform the voice input, first, the driver presses the switch 42 provided to the operation lever 26A. Thereby, the voice recognition part 40b of the multifunctional portable information terminal 40 is set in an on state. Then, when the driver utter a voice "raise the number of revolutions of the engine" or "SP", the microphone 40a of the multifunctional portable information terminal 40 picks up the voice of the driver, and sends the voice signal corresponding to the voice to the voice recognition part 40b.

The voice recognition part 40b of the multifunctional portable information terminal 40 applies the voice recognition process to the sent voice signal, and sends the process signal for instructing the "raising the number of revolutions of the engine" to the controller 30. Upon receipt of the process signal, the controller 30 sends a command to the ECU 74 to increase the number of revolutions by a predetermined number of revolutions based on the process signal. Upon reception of the command, the ECU 74 causes the number of revolutions of the engine 11 to be increased by the predetermined number of revolutions.

Further, the controller 30 sends a signal to the regulator in order to increase the output horse power of the main pump 14 to correspond to the increase in the number of revolutions of the engine. Thereby, as illustrated in FIG. 10, the pump output characteristic is changed, for example, from I1 into I2 so that the output horse power of the main pump 14 is increased.

Figure 10:
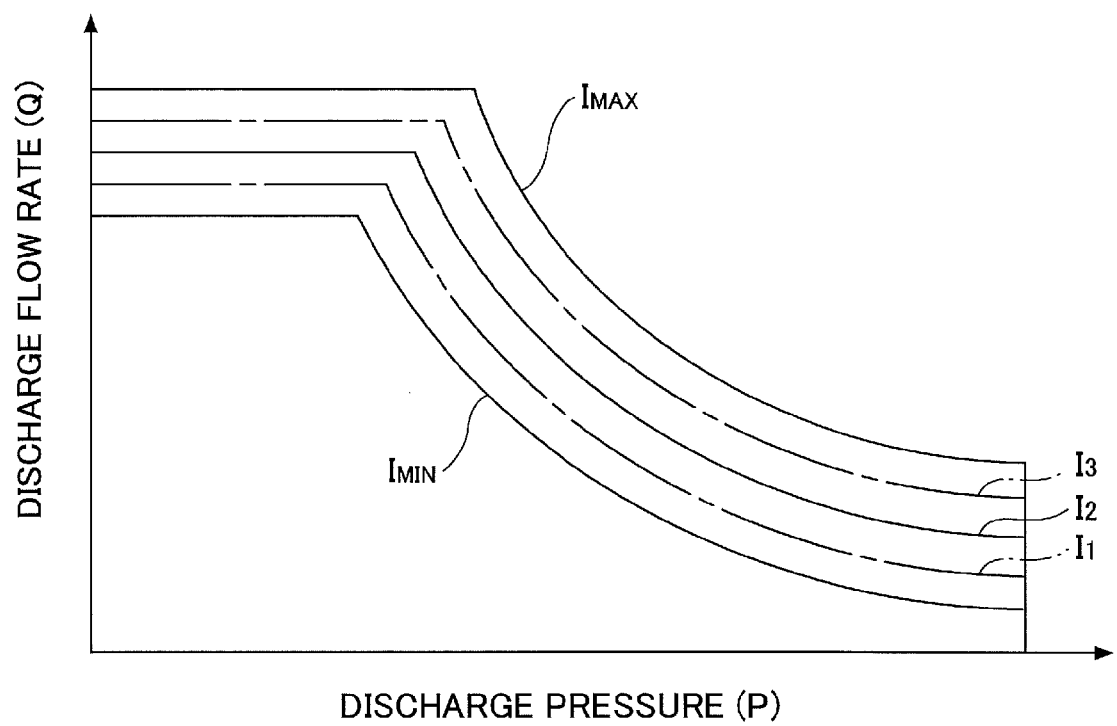
FIG. 10 is a property chart illustrating a relationship between a discharge pressure and a discharge flow rate of a main pump when a number of revolutions of an engine is maintained constant.

FIG. 10 is a characteristic diagram indicating a relationship between a discharge pressure (P) and discharge flow rate (Q) of the main pump 14 in a case where the number of revolutions of the engine 11 is maintained constant. In the example illustrated in FIG. 10, the number of revolutions of the engine can be changed in 5 steps, and the pump output characteristics of the main pump 14 at the numbers of revolutions are $I_{MIN}$ $I_1$, $I_2$, $I_3$ and $I_{MAX}$.

The driver may perform a function other than the function for increasing the number of revolutions of the engine by using the voice input function of the multifunctional portable information terminal 40. For example, the driver may perform a function for changing the run mode, a function for displaying an image, which is taken by a camera attached to the shovel, on the display and input device 40c, a function for establishing a communication between the controller 30 and a management apparatus 90 installed outside the shovel.

For example, there may be a case where the shovel is provided with a imaging device 80 for taking an image of a prat out of the driver's view (refer to FIG. 3 to FIG. 5). For example, imaging device 80 is a so-called back monitor camera that takes an image of a direction opposite to a direction in which the cabin 10 faces (a rearward direction) to provide the image to the driver. In the present embodiment, the image data obtained by the imaging device 80 is sent to the controller 30. The controller 30 transfers the received image data to the multifunctional portable information terminal 40 to cause the image to be displayed on the display and input device 40c of the multifunctional portable information terminal 40. Thereby, the driver can recognize the image taken by the imaging device 80 with the multifunctional portable information terminal 40.

Figure 11:
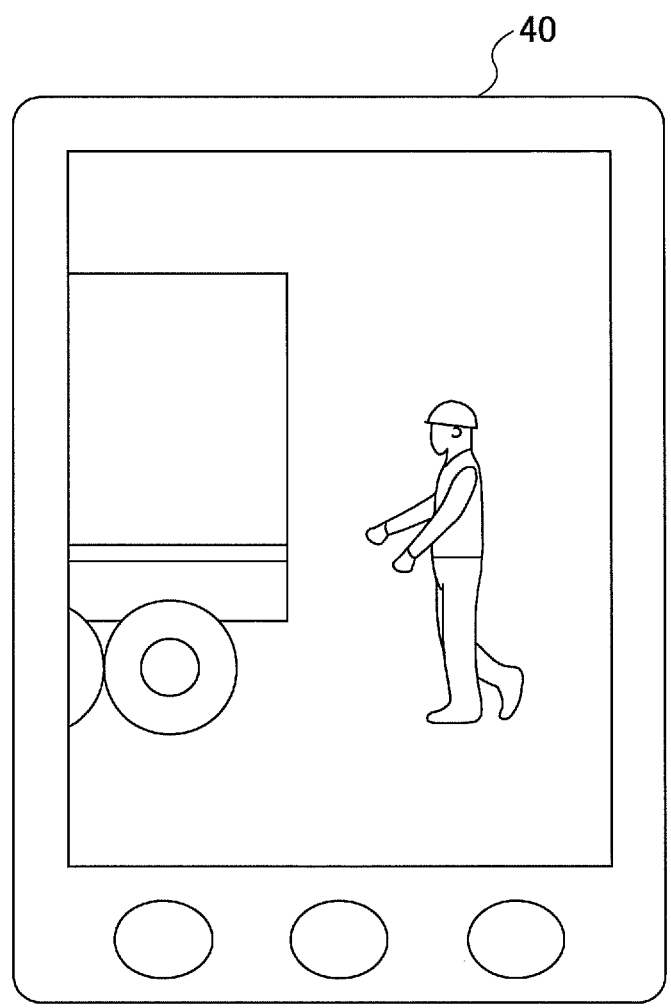
FIG. 11 is an example of a screen of a display part of the multifunctional portable information terminal where an image taken by a back monitor camera is displayed.

FIG. 11 is an illustration illustrating a state where an image take by the back monitor camera is displayed on the display and input device 40c of the multifunctional portable information terminal 40. An image of an area of the vicinity of a rear part of the shovel, which cannot be seen by the driver, is displayed on the display and input device 40c of the multifunctional portable information terminal 40, and the driver can check the situation of the rear direction of the shovel by moving the sight to the display and input device 40c of the multiple portable information terminal 40 while facing forward. The multifunctional portable information terminal 40 may display an image taken by a side monitor camera so that the driver can check a side direction of the shovel.

As mentioned above, according to the present embodiment, the multifunctional portable information terminal 40 can be easily mounted to the shovel on the user side to use it as a display and input device by using the multifunction portable information terminal 40 as the display and input device of the shovel without originally mounting an expensive and exclusive display and input device to the shovel. Additionally, it becomes possible to perform various controls and managements of the shovel using various functions of the multifunctional portable information terminal 40. For example, as usable functions of the multifunctional portable information terminal, there are a calling function, image taking function, vibration measuring function, orientation determining function, GPS function, map displaying function, etc. Additionally, not only the multifunctional portable information terminal 40 such as a smartphone or the like but also an eye-glass type multifunctional portable information terminal may be used as the display and input device of the shovel.

In the shovel having the above-mentioned structure, the controller 30 determines whether an abnormality occurs in the shovel based on information including the above-mentioned various kinds of data. Then, if it is determined that an abnormality occurs, the controller 30 sends data, which is accumulated in the temporary storing part 30a from time t1 to time t2, to the multifunctional portable information terminal 40, the time t1 being a predetermined time period before the time at which the determination of the occurrence of the abnormality was made, the time t2 being the time at which the determination of the occurrence of the abnormality was made.

The multifunctional portable information terminal 40 may display data sent from the controller 30 in a time series manner or display the data on the display and input device 40c by converting the data into a graph. The driver of the shovel can grasp a state of the shovel before an occurrence of an abnormality by looking the time series data or the graph displayed on the multifunctional portable information terminal 40, and can determine what abnormality occurs or which part causes the abnormality.

Moreover, the date sent from the controller 30 may be sent to a remote management apparatus 90 using a wireless communication function of the multifunctional portable information terminal 40 (packet communication) so that the data is displayed on the management apparatus 90. The management apparatus 90 is, for example, a computer installed in a manufacturer or service center of the shovel, and a specialized staff can grasp a state of the shovel while the stuff is at a remote place. Accordingly, before the stuff goes to repair the shovel, the staff can previously identify a cause of the abnormality or bring components necessary for repairing the shovel, thereby reducing a time spent on a maintenance or repair.

Alternatively, if it is determined that an abnormality occurs, the controller 30 may transfer the date accumulated in the temporary storing part 30a to an abnormality information storing part in the controller 30. The data transferred to the abnormality information storing part may be sent to and displayed on the multifunctional portable information terminal 40 at a time when it becomes necessary thereafter, or may be sent further to the management apparatus 90 of the service center from the multifunctional portable information terminal 40 through a communication network. In the service center, the data at the time of occurrence of the abnormality may be displayed on a display part of the management apparatus 90 to identify a part where the abnormality occurs or a kind of the abnormality.

Figure 12:
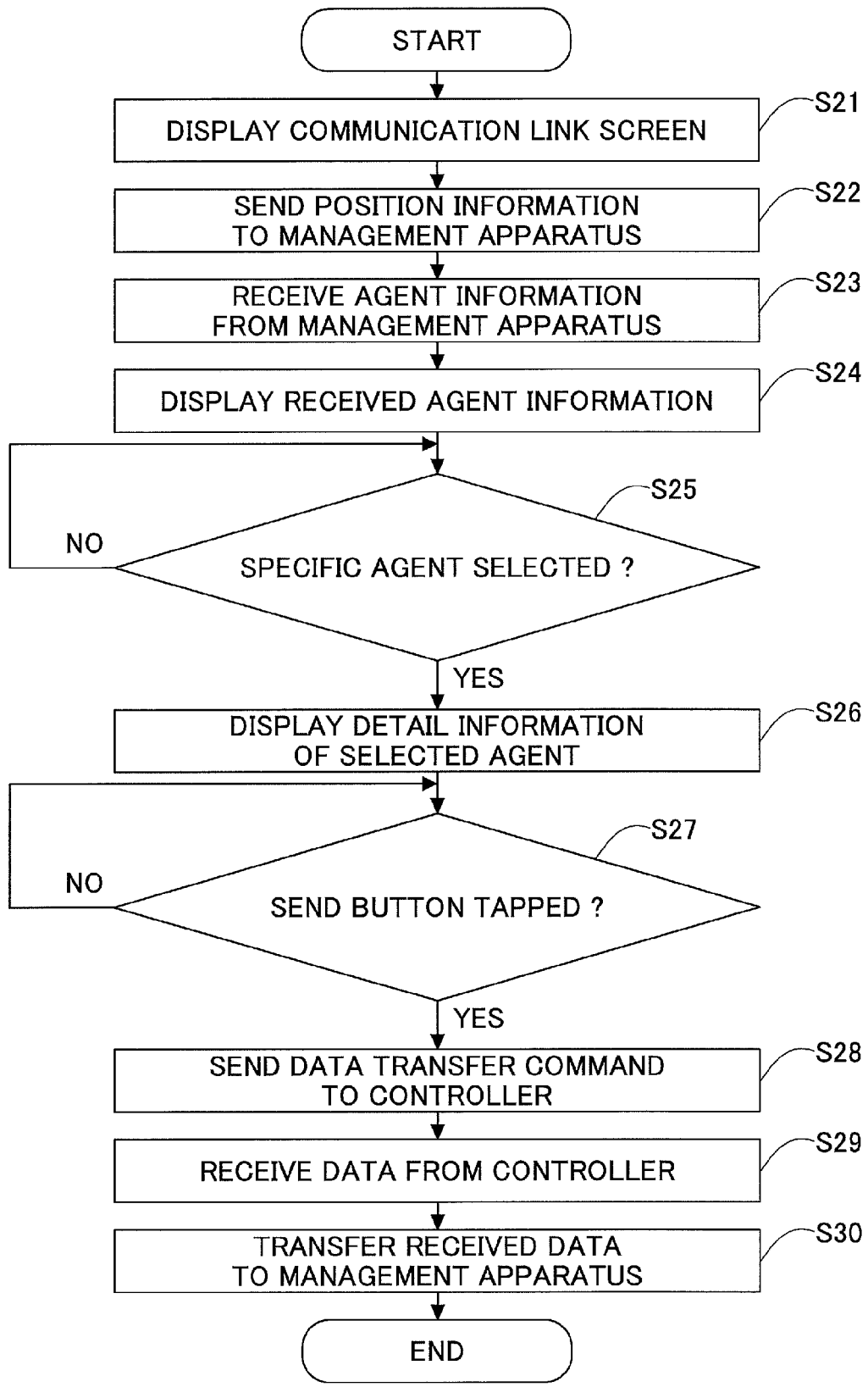
FIG. 12 is a flowchart of a shovel abnormality time process.
Figure 13:
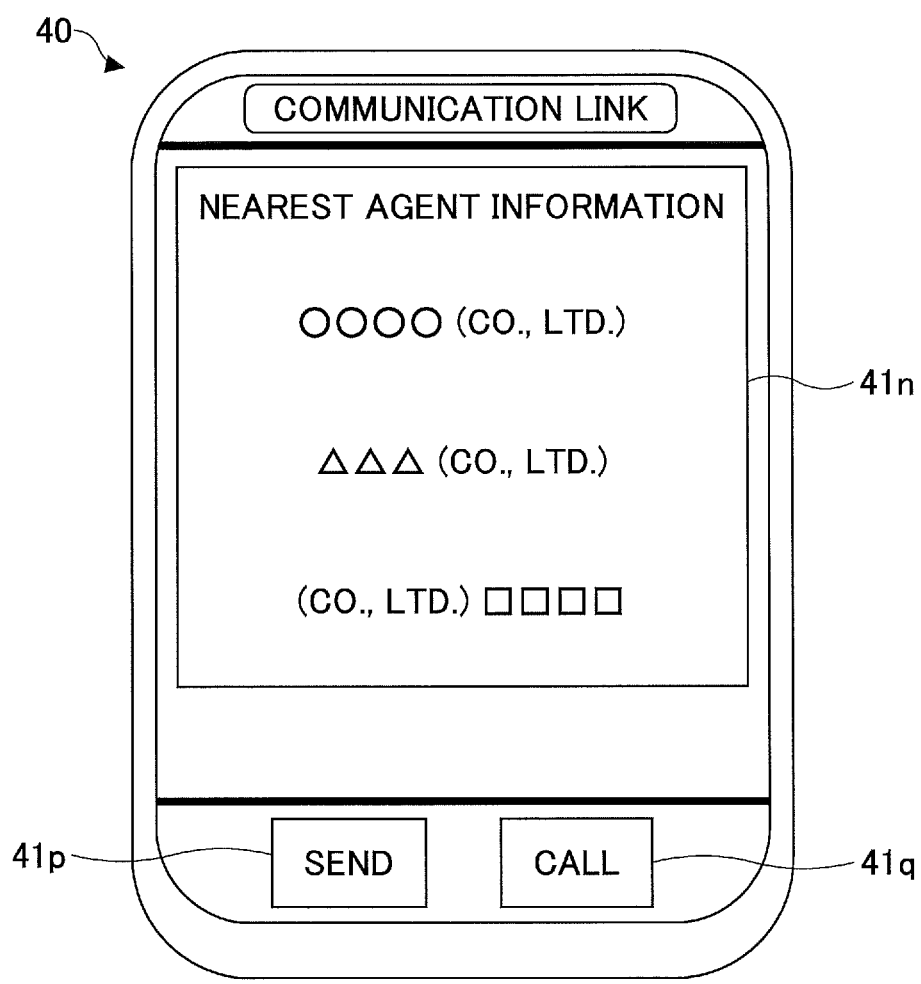
FIG. 13 is an example of a communication link screen.
Figure 14:
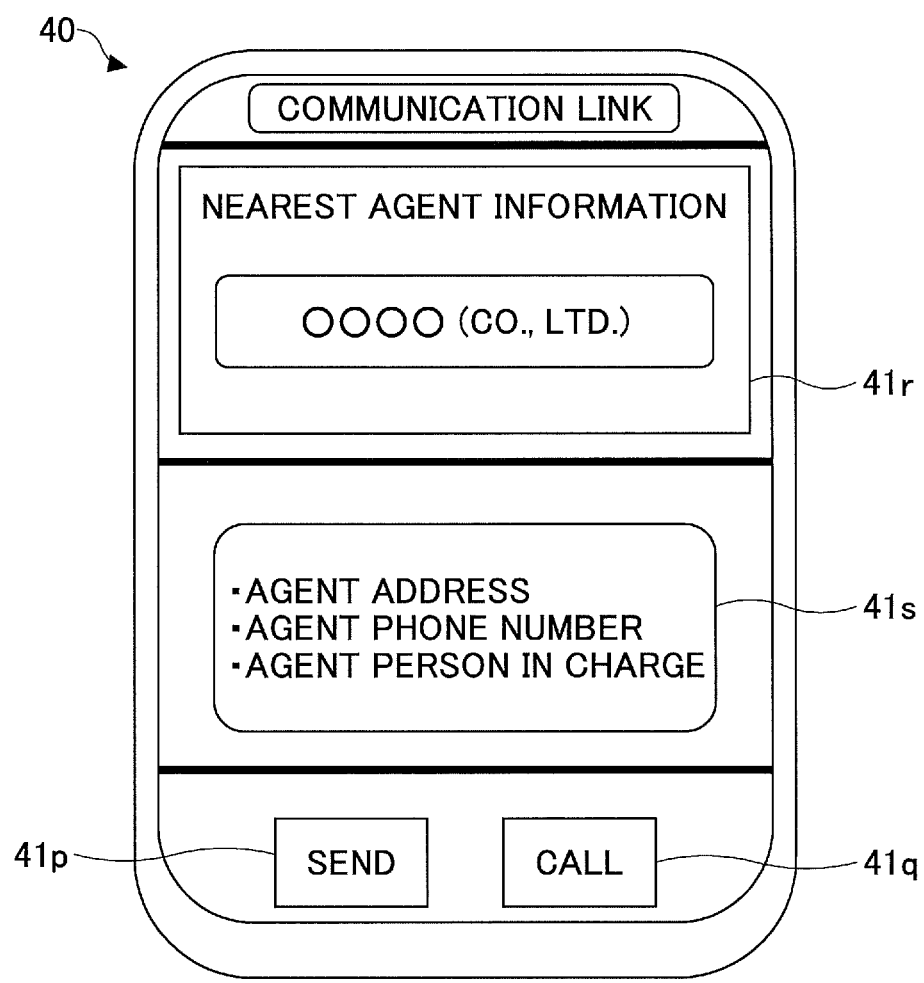
FIG. 14 is another example of the communication link screen.

Next, a description is given, with reference to FIG. 12 through FIG. 14, of a process performed in the multifunctional portable information terminal 40 (hereinafter, referred to as the "shovel abnormal time process") when an abnormality of the shovel is detected. FIG. 12 is a flowchart indicating a flow of the shovel abnormality time process. FIG. 13 and FIG. 14 are examples of a screen that displays various kinds of information acquired through a communication with the management apparatus 90 (hereinafter, referred to as the "communication link screen"). Additionally, the multifunctional portable information terminal 40 performs the shovel abnormal time process when an abnormality of the shovel is detected based on a notification from the controller 30.

First, the multifunctional portable information terminal 40 displays the communication link screen (step S21). In the present embodiment, the communication link screen includes, as illustrated in FIG. 13, an agent information display part 41n, send button 41p and call button 41q. The agent information display part 41n is an area for displaying information regarding a contact address at the time of abnormality in the shovel. The send button 41*p* and call button 41*q* are software buttons displayed on the display and input device 40*c*. When the send button 41*p* is tapped, the multifunctional portable information terminal 40 sends the data stored in a predetermined area in the controller 30. When the call button 41*q* is tapped, the multifunctional portable information terminal 40 makes a call to the contact address, which is in a selected state on the display and input device 40*c*.

Thereafter, the multifunctional portable information terminal 40 sends position information of its own to the management apparatus 90 (step S22). In the present embodiment, the multifunctional portable information terminal 40 sends position information acquired using the GPS function to the management apparatus 90. The management apparatus 90 creates agent information by searching information regarding an agent existing within a predetermined distance range from the present position of the multifunctional portable information terminal 40 based on the position information received from the multifunctional portable information terminal 40. Then, the management apparatus 90 sends the created agent information to the multifunctional portable information terminal 40.

Thereafter, the multifunctional portable information terminal 40 receives the agent information from the management apparatus 90 (step S23), and displays the received agent information on the agent information display part 41*n* of the communication link screen (step S24). FIG. 13 illustrates a state where three agents are retrieved as a nearest agent.

Thereafter, the multifunctional portable information terminal 40 determines whether a specific agent is selected (step S25). In the present embodiment, the multifunctional portable information terminal 40 determines whether any one of the areas corresponding to the respective three agents in the agent information display part 41*n* is tapped by the driver.

If it is determined that a specific agent is not selected yet (NO in step S25), the multifunction portable information terminal 40 waits until a specific agent is selected.

If it is determined that a specific agent is selected (YES in step S25), the multifunction portable information terminal 40 displays the selected agent and detail information of the selected agent on the display and input device 40*c* (step S26). In the present embodiment, the multifunction portable information terminal 40 displays the communication link screen containing a selected agent display part 41*r*, which displays the selected specific agent, and a detail information display part 41*r*, which displays information of details of the selected specific agent. FIG. 14 illustrates a state where a specific agent is selected and information of details of the selected agent is displayed.

Thereafter, the multifunction portable information terminal 40 determines whether the sending button 41*p* is tapped (step S27).

Then, if it is determined that the send button 41*p* is not tapped (NO in step S27), the multifunction portable information terminal 40 waits until the send button 41*p* is tapped.

On the other hand, if it is determined that the send button 41*p* is tapped (YES in step S27), the multifunction portable information terminal 40 sends a data transfer command to the controller 30 (step S28). In the present embodiment, upon reception of the data transfer command, the controller 30 sends data, which is stored in a predetermined area such as the temporary storing part 30*a*, the abnormality information storing part, etc., to the multifunction portable information terminal 40.

Thereafter, the multifunction portable information terminal 40 receives the data sent from the controller 30 (step S29), and transfers the received data to the management apparatus 90 (step S30).

If the call button 41*q* is tapped, the multifunction portable information terminal 40 dials the telephone number of the agent that is set in a selected state.

As mentioned above, the multifunction portable information terminal 40 automatically displays the communication link screen when an abnormality is detected in the shovel so that the driver can easily take measures such as a contact to the agent.

Figure 15:
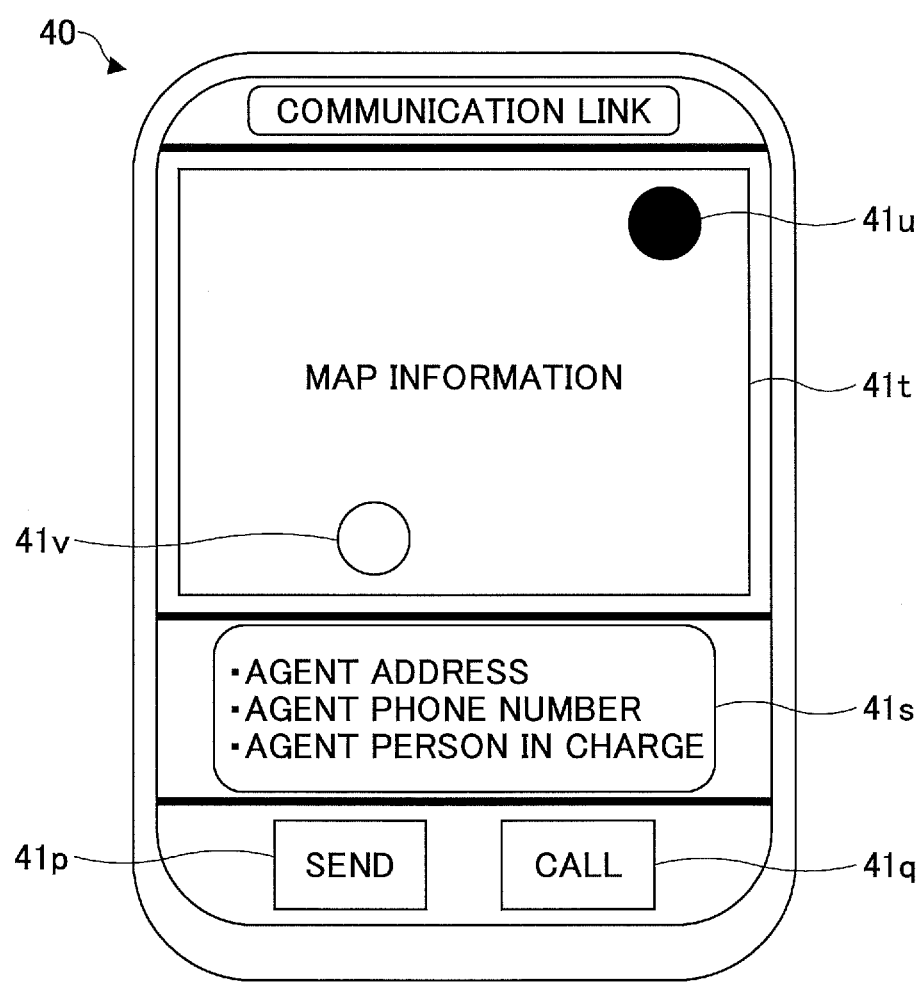
FIG. 15 is a further example of the communication link screen.

Next, a description is given, with reference to FIG. 15, of another example of the communication link screen displayed on the display and input device 41*c* when performing the shovel abnormality time process. The communication link screen illustrated in FIG. 15 includes the send button 41*p*, call button 41*q*, detail information display part 41*s* and a map display part 41*t*.

In the present embodiment, the multifunction portable information terminal 40 receives agent information from the management apparatus 90, and displays the communication link screen on the display and input device 40*c* after a specific agent is selected. Note that the multifunction portable information terminal 40 may display the communication link screen before a specific agent is selected.

The map display part 41*t* is a part for displaying map information, and includes a present position icon 41*u*, which indicates a present position of the shovel (the multifunction portable information terminal 40), and an agent position icon 41*v*, which indicates a position of the retrieved or selected agent.

The driver can perform scrolling, reducing and enlarging of map information on the map display part 41*t* using a swipe operation, pinch-in operation, pinch-out operation, etc., on the multifunction portable information terminal 40.

As mentioned above, the multifunction portable information terminal 40 displays the map information when an abnormality is detected in the shovel so that the driver can easily recognize a positional relationship between the shovel and the agent. Additionally, the multifunction portable information terminal 40 makes an exclusive communication controller, which is to be attached to the shovel, unnecessary so as to attempt a cost reduction of the shovel. Moreover, the vibration measuring function provided in the multifunction portable information terminal 40 can be used in a failure analysis of components constituting the shovel. Furthermore, the orientation determining function provided in the multifunction portable information terminal 40 can be used when displaying an orientation of the shovel on the map display part 41*t*.

Figure 16:
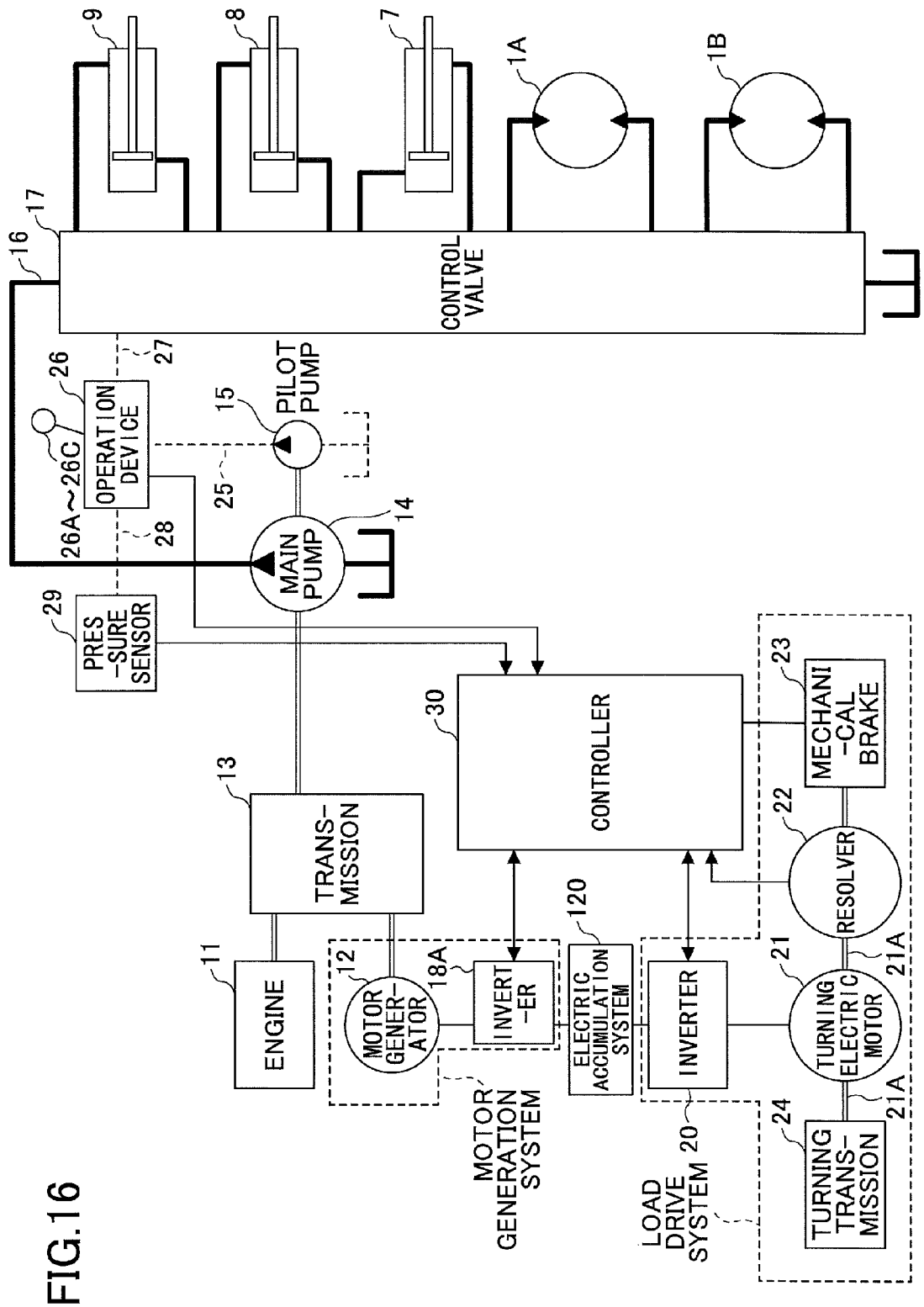
FIG. 16 is a block diagram of a drive system of a hybrid shovel according to an embodiment of the present invention.

Although the multifunction portable information terminal is mounted to the shovel in the above-mentioned embodiments, the multifunction portable information terminal may be mounted to a hybrid shovel having a structure illustrated in FIG. 16. A description is given below of a structure of a hybrid shovel. In FIG. 16, double lines denote a mechanical power system, bold solid lines denote high-pressure hydraulic lines, dashed thin lines denote pilot lines, and thin solid lines denotes an electric drive/control system.

An engine 11 as a mechanical drive part and a motor generator 12 as an assist drive part are connected to two input axes of a transmission 13, respectively. A main pump 14 and pilot pump 15 as hydraulic pumps are connected to an output axis of the transmission 13. A control valve 17 is connected to the main pump 14 via a high-pressure hydraulic line 16.

The control valve 17 is a control device for controlling the hydraulic system in the hybrid shovel. Hydraulic motors 1A (right) and 1B (left) for the lower running body 1, a boom cylinder 7, an arm cylinder 8 and a bucket cylinder 9 are connected to the control valve 17 via the high-pressure hydraulic lines.

An electric accumulation system 120 including a capacitor as an electric accumulator is connected to the motor generator via an inverter 18A. A turning electric motor 21 as an electric work element is connected to the electric accumulation system 120 via an inverter 20. A resolver 22, mechanical brake 23 and turning transmission 24 are connected to a rotation axis 21A of a turning electric motor 21. An operation device 26 is connected to the pilot pump 15 via a pilot line 25. The turning electric motor 21, inverter 20, resolver 22, mechanical brake 23 and turning transmission 24 together constitute a load drive system.

The operation device 26 includes a lever 26A, lever 26B and pedal 26C. The lever 26A, lever 26B and pedal 260 are connected to the control valve 17 and the pressure sensor 29 via hydraulic lines 27 and 28, respectively. The pressure sensor 29 is connected to the controller 30, which performs a drive control for an electric system.

The controller 30 is a control device as a main control part for performing a drive control for the hybrid shovel. The controller 30 is constituted by an operation processing device including a CPU (Central Processing Unit) and an internal memory, and is a device materialized by the CPU executing a drive control program stored in the internal memory.

The controller 30 converts a signal supplied from the pressure sensor 29 into a speed command to perform the drive control on the turning electric motor 21. The signal supplied from the pressure sensor 29 corresponds to a signal representing an amount of operation when the operation device 26 is operated to turn a turning mechanism 2.

The controller 30 performs a drive control of the motor generator 12 (switching between an electric drive (assist) operation and a generating operation), and also performs a charge and discharge control of the capacitor as an electric accumulation part of the electric accumulation system 120 by drive-controlling a voltage up and down converter of the electric accumulation system 120. The controller 30 performs a switching control between an voltage-up operation and a voltage-down operation of the voltage up and down converter based on a charge state of the capacitor, a drive state of the motor generator 12 (an electric drive (assist) operation or a generating operation) and a drive state of the turning electric motor 21 (a power running operation or a regenerative operation), and, thereby, performing a charge and discharge control of the capacitor.

The present invention is not limited to the specifically disclosed embodiments using the above-mentioned shovel as an example, and various variations and modifications may be made without departing from the scope of the present invention.

What is claimed is:

1. A shovel performing a work by being operated by a driver, comprising:
    a lower running body;
    an upper turning body mounted on said lower running body;
    an engine arranged on said upper turning body;
    a hydraulic pump discharging an operating oil by a power of said engine;
    a hydraulic actuator driven by the operating oil discharged by said hydraulic pump;
    a control device controlling an operation of said hydraulic actuator in response to an operation applied to an operation lever;
    a cabin provided in said upper turning body; and
    an attaching part provided in said cabin and configured to be capable of attaching a multifunctional portable information terminal having a display and input function, a wireless communication function, and a voice recognition function that converts a voice signal from a microphone into a command,
    wherein said attaching part includes a connecting part connected to said multifunctional portable information terminal,
    said control device receives the command transmitted from said multifunctional portable information terminal through the connecting part, and supplies electric power from an electric accumulation part of said shovel to said multifunctional portable information terminal through said connecting part, and
    said control device executes a predetermined function in response to receiving the command, the predetermined function including a function executable by manually operating an input device other than the operation lever, the input device being provided in the cabin.

2. The shovel as claimed in claim 1, wherein said multifunctional portable information terminal has a calling function, an image taking function, a vibration measuring function, an orientation determining function, a GPS function and a map displaying function.

3. The shovel as claimed in claim 1, wherein when said control device determines that an abnormality occurs in said shovel, said control device sends and displays physical amount data and input amount data to and on said multifunctional portable information terminal, the physical amount data representing a physical amount acquired by detecting a state of said shovel, the input amount data representing an input amount input to said control device, during a period from a time before the time at which the determination of the occurrence of the abnormality was made until the time at which the determination of the occurrence of the abnormality was made.

4. The shovel as claimed in claim 3, wherein said control device causes said multifunctional portable information terminal to send the input amount data and the physical amount data, which are sent to said multifunctional portable information terminal, by wireless.

5. The shovel as claimed in claim 4, wherein a destination of said sending by wireless is selected by a display and input part of said multifunctional portable information terminal.

6. The shovel as claimed in claim 1, wherein said control device causes a voice recognition device of said multifunctional portable information terminal to recognize the voice signal input with a voice of a driver, and to determine the command corresponding to the input voice signal.

7. The shovel as claimed in claim 1, wherein a switch to turn ON/OFF a voice input function of said multifunctional portable information terminal is provided to the operation lever of said shovel.

8. The shovel as claimed in claim 7, wherein a signal is transmitted to the control device in response to the switch being operated to turn ON the voice input function, and the control device sends a control signal to the multifunctional portable information terminal based on the transmitted signal to turn ON the voice input function.

9. The shovel as claimed in claim 1, wherein said control device causes a display and input part of said multifunctional portable information terminal to display an image taken by a camera mounted on a cover of said shovel.

10. The shovel as claimed in claim 1, wherein a vibration suppressing mechanism is provided to said attaching part.

11. The shovel as claimed in claim 1, wherein said attaching part is attached to a right front frame from among frames constituting said cabin of said shovel.

12. The shovel as claimed in claim 1, wherein the control device starts cooperating with the multifunctional portable information terminal to be ready to receive the command from the multifunctional portable information terminal, in response to the multifunctional portable information terminal being attached to the attaching part and authenticated by the control device.

13. A shovel performing a work by being operated by a driver, comprising:
   a lower running body;
   an upper turning body mounted on said lower running body;
   an engine arranged on said upper turning body;
   a hydraulic pump discharging an operating oil by a power of said engine;
   a hydraulic actuator driven by the operating oil discharged by said hydraulic pump;
   a control device controlling an operation of said hydraulic actuator in response to an operation applied to an operation lever;
   a cabin provided in said upper turning body; and
   an attaching part provided in said cabin and configured to be capable of attaching a multifunctional portable information terminal having a display and input function, a wireless communication function, and a voice recognition function that converts a voice signal from a microphone into a command,
   wherein said attaching part includes a connecting part connected to said multifunctional portable information terminal,
   said control device receives the command transmitted from said multifunctional portable information terminal through the connecting part, and supplies electric power from an electric accumulation part of said shovel to said multifunctional portable information terminal through said connecting part,
   the operation lever includes a pair of operation levers provided on opposite sides of a driver's seat, and
   said control device executes a predetermined function in response to receiving the command, so that the driver is enabled to execute the predetermined function without releasing the pair of operation levers, while the driver is being seated on the driver's seat, during an operation of the shovel.

* * * * *